Oct. 1, 1946.  R. L. AKERS  2,408,359
COUPLING AND STEERING UNIT
Filed June 29, 1945
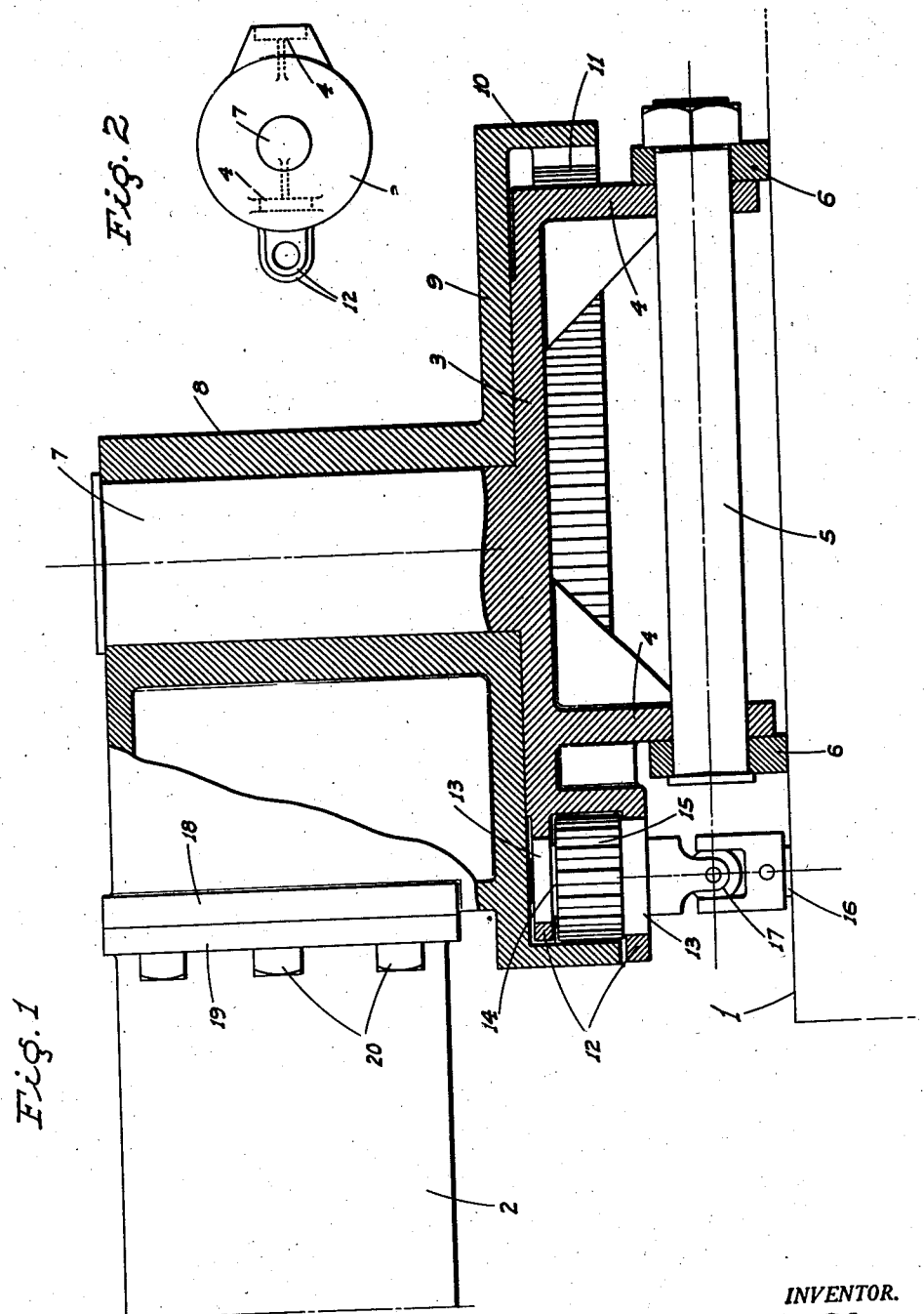
INVENTOR.
R. L. Akers
BY
*Corbater & Webster,*
ATTYS Patented Oct. 1, 1946

2,408,359

UNITED STATES PATENT OFFICE 2,408,359

COUPLING AND STEERING UNIT

Richard Lawrence Akers, Peoria, Ill., assignor to R. G. Le Tourneau, Inc., Stockton, Calif., a corporation of California Application June 29, 1945, Serial No. 602,346

10 Claims. (Cl. 180—79.4)

1

This invention is directed to a draft coupling and power steering unit for a tractor-trailer vehicle combination wherein said unit connects the tractor to the trailer and additionally functions to power steer the tractor regardless of the relative lateral tilt between the tractor and trailer as occasioned by the vehicle combination traversing uneven ground.

The above draft coupling and power steering unit is designed, for example, to couple a tractor of the two-wheel "Tournapull" type to a trailer such as a dump wagon, wheel-supported portable crane, earth carrying scraper, or other similar construction equipment.

One feature of the herein described draft coupling and power steering unit is the novel mechanism employed to transmit a reversible, tractor steering drive from the tractor to said unit regardless of the lateral tilt therebetween; such mechanism including a universal joint disposed with its center of universal movement alined with the longitudinal axis about which said unit is adapted to tilt relative to the tractor.

Another feature of the instant invention is to provide a draft coupling and power steering unit which includes, in combination with a pair of cooperating members secured together for rotation about an upstanding axis and wherein one of said members is connected in fixed relation to the trailer, and the other of said members is connected to the tractor for unitary lateral tilting of said members relative to the same; a ring gear secured concentrically with said one member; a pinion journaled on the member and meshing with the gear; and drive mechanism arranged to reversibly drive the pinion from the tractor regardless of the relative lateral tilt between the same and said unitary members.

An additional feature of the invention is to provide a draft coupling and power steering unit which is simple but rugged in structure, and yet exceedingly effective for the purpose for which it is intended.

These objects are accomplished by means of such structure and relative arrangement of parts as will fully appear by a perusal of the following specification and claims.

In the drawing similar characters of reference indicate corresponding parts in the several views:

Figure 1 is a sectional elevation of the improved draft coupling and power steering unit.

Figure 2 is a plan view, on reduced scale, of the supporting disc structure.

Referring now more particularly to the characters of reference on the drawing, the unit is adapted to be connected between the deck 1 at the rear of a tractor and the front end of a rigid, forwardly projecting draft tongue or yoke 2 of a trailer, whereby the tractor is connected in draft and steerable relation to said trailer; the unit comprising the following structure:

An upwardly facing, substantially circular supporting disc 3 is disposed above the deck 1 in spaced relation thereto; said supporting disc 3 including legs 4 which depend therefrom on opposite sides lengthwise of the tractor. Adjacent their lower ends the legs 4 are laterally swingably or tiltably journaled in connection with a substantially horizontal, longitudinally extending spindle 5 supported at its ends by brackets 6 fixed in connection with and upstanding from the deck 1 of the tractor.

The supporting disc 3 is provided, substantially centrally thereof, with a rigid upstanding post 7 of cylindrical configuration, and about which post a sleeve 8 is turnably mounted. The sleeve 8 is formed at its lower end in connection with another disc 9 which seats in matching turnable relation on top of the supporting disc 3; the disc 9 hereinafter being termed the upper disc.

The upper disc extends beyond the periphery of the supporting disc 3 and the depending legs 4, as shown, and said upper disc is formed at its periphery with a depending annular flange 10 formed on the inner face with an internal gear 11. The supporting disc 3 is formed, at the back of the device, i. e. overhanging the deck 4 rearwardly of the spindle 5, with a vertically spaced pair of bearing supporting rings 12 which carry bearings 13 for an upstanding shaft 14 journaled in connection with and extending between said bearings. Between the bearings 13 the shaft 14 is fitted with a pinion 15 which meshes with the internal ring gear 11.

Another shaft 16 projects upwardly through the deck 1 from within the tractor and into substantially endwise alinement with the shaft 14; the shaft 16 being selectively and reversibly driven by tractor engine-actuated power transmission means (not shown). The adjacent ends of the shafts 14 and 16 are coupled together, rearwardly of the spindle 5, by means of a universal joint 17 whose center of universal movement is alined with the axis of said spindle 5, and consequently the axis of lateral tilting movement of the unitary assembly of discs 3 and 9, together with the post 7 and surrounding sleeve 8. In other words, the universal joint 17 couples shafts 14 and 16 in a manner so that the pinion 15 may be driven from said shaft 16 regardless of the relative lateral tilt between the tractor and the described power steering unit.

Such unit is connected in fixed relation to the trailer by means of a flat, upstanding, and normally rearwardly facing attachment plate 18 formed with the sleeve 8 and upper disc 9, as shown; said attachment plate 18 being secured to a corresponding attachment plate 19 on the front end of the draft tongue or yoke 2 of the trailer, by bolts 20.

When the power steering unit is in use, the selective reversible drive from the shaft 16 is transmitted, through the universal joint 17, to the pinion 15, causing the same to rotate with resultant travel between said pinion and the internal ring gear 11. Such travel between the pinion and ring gear is reflected as relative rotation between the post 7 and sleeve 8, which causes steering of the tractor relative to the trailer, and which steering is accomplished, as previously explained, regardless of the relative lateral tilt between the steering unit and the tractor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A tractor-trailer draft coupling and power steering unit comprising a pair of cooperating members secured together for relative rotation about an upstanding axis, means adapted to connect one member in fixed relation to the trailer, means adapted to connect the other member to the tractor for unitary lateral tilting of said members relative to said tractor about a longitudinal axis, a ring gear secured concentrically with said one member, a pinion carried by and journaled on the other member about a vertical axis and meshing with the gear, and drive means connected in driving relation to the pinion and operable to drive the latter regardless of the relative lateral tilt between the tractor and said unitary members.

2. A tractor-trailer draft coupling and power steering unit comprising a pair of cooperating members secured together for relative rotation about an upstanding axis, means adapted to connect one member in fixed relation to the trailer, means adapted to connect the other member to the tractor for unitary lateral tilting of said members relative to said tractor about a longitudinal axis, a ring gear secured concentrically with said one member, a pinion carried by and journaled on the other member about a vertical axis and meshing with the gear, and mechanism arranged to reversibly drive the pinion regardless of the relative lateral tilt between the tractor and said unitary members; said mechanism including an upstanding pinion supporting shaft, an upstanding tractor supported drive shaft in substantially vertical alinement with the pinion supporting shaft, and a universal joint connecting adjacent ends of the shafts, the center of universal movement of said joint being substantially alined with the axis of tilting movement of said unitary members.

3. A tractor-trailer draft coupling and power steering unit comprising a pair of cooperating members secured together for relative rotation about an upstanding axis, means adapted to connect one member in fixed relation to the trailer, means adapted to connect the other member to the tractor for unitary lateral tilting of said members relative to said tractor about a longitudinal axis, a ring gear secured concentrically with said one member, a pinion carried by and journaled on the other member about a vertical axis and meshing with the gear, and a drive shaft assembly connected in driving relation to the pinion and operative regardless of the relative lateral tilt between the tractor and said unitary members; said drive shaft assembly including a universal joint disposed with its center of universal movement substantially alined with the axis of tilting movement of said unitary members.

4. A tractor-trailer draft coupling and power steering unit comprising a pair of cooperating members secured together for relative rotation about an upstanding axis, means adapted to connect one member in fixed relation to the trailer, means adapted to connect the other member to the tractor for unitary lateral tilting of said members relative to said tractor about a longitudinal axis, a ring gear secured concentrically with said one member, a pinion carried by and journaled on the other member about a vertical axis and meshing with the gear, the pinion being disposed for rotation about an upstanding axis, and an upstanding drive shaft assembly connected to the pinion, and said assembly including a universal joint with its center of universal movement substantially alined with the axis of tilting of said members.

5. A tractor-trailer draft coupling and power steering unit comprising a pair of cooperating members secured together for relative rotation about an upstanding axis, means adapted to connect one member in fixed relation to the trailer, means adapted to connect the other member to the tractor for unitary lateral tilting of said members relative to said tractor about a longitudinal axis, a ring gear secured concentrically with said one member, a pinion carried by and journaled on the other member about a vertical axis and meshing with the gear, the pinion being disposed for rotation about an upstanding axis, and an upstanding drive shaft assembly connected to the pinion, and said assembly including a universal joint with its center of universal movement substantially alined with the axis of tilting movement of said unitary members.

6. A tractor-trailer draft coupling and power steering unit comprising an upwardly facing supporting disc, means adapted to mount the disc on the tractor for relative lateral tilting about a longitudinally extending axis, another disc mounted in face to face relation on the supporting disc and being rotatable thereon about a vertical axis, means adapted to fix said other disc in rigid connection with the trailer, and driving mechanism, including a universal joint, arranged to cause relative rotation between the discs the center of universal movement of such joint being substantially alined with the longitudinal axis of tilting of said supporting disc whereby the relative rotation between the discs may be effected without affecting the relative lateral tilt between the supporting disc and the tractor.

7. A tractor-trailer draft coupling and power steering unit comprising an upwardly facing supporting disc, means adapted to mount the disc on the tractor for relative lateral tilting about a longitudinally extending axis, another disc mounted in face to face relation on the supporting disc and being rotatable thereon about a vertical axis, means adapted to fix said other disc in rigid connection with the trailer, and driving mechanism, including a universal joint, arranged to cause relative rotation between the discs regardless of said relative lateral tilt; the universal joint being disposed with its center of universal movement substantially alined with said longitudinally extending axis.

8. A tractor-trailer draft coupling and power steering unit comprising an upwardly facing supporting disc, means adapted to mount the disc on the tractor for relative lateral tilting about a longitudinally extending axis, an upstanding post on said supporting disc, a sleeve relatively turnably surrounding the post, another disc on the lower end of the post engaging said supporting disc for relative rotation, means adapted to fix the sleeve in rigid connection with the trailer, and driving mechanism, including a universal joint, arranged to cause relative rotation between the post and sleeve, the center of universal movement of said joint being substantially alined with the longitudinal axis of tilting of said supporting disc whereby the relative rotation between the post and sleeve may be effected without affecting the relative lateral tilt between the supporting disc and the tractor.

9. A tractor-trailer draft coupling and power steering unit comprising an upwardly facing supporting disc, means adapted to mount the disc on the tractor for relative lateral tilting about a longitudinally extending axis, an upstanding post on said supporting disc, a sleeve relatively turnably surrounding the post, another disc on the lower end of the post engaging said supporting disc for relative rotation, means adapted to fix the sleeve in rigid connection with the trailer, and driving mechanism, including a universal joint, arranged to cause relative rotation between the post and sleeve; the universal joint being disposed with its center of universal movement substantially alined with said longitudinally extending axis.

10. A tractor-trailer draft coupling and power steering unit comprising an upwardly facing supporting disc, means adapted to mount the disc on the tractor for relative lateral tilting about a longitudinally extending axis, an upstanding post on said supporting disc, a sleeve relatively turnably surrounding the post, another disc on the lower end of the post engaging said supporting disc for relative rotation, means adapted to fix the sleeve in rigid connection with the trailer, a ring gear on said other disc, a pinion journaled in connection with the supporting disc and meshing with said gear, the pinion having an upstanding axis, and an upstanding drive shaft assembly coupled to the pinion; said assembly including a universal joint whose center of universal movement is substantially alined with said longitudinally extending axis.

RICHARD LAWRENCE AKERS.